United States Patent

Alsobrooks et al.

Patent Number: 5,291,822
Date of Patent: Mar. 8, 1994

[54] DIAPHRAGM FOR PRESSURE REGULATORS AND METHOD OF MAKING

[75] Inventors: Daniel E. Alsobrooks; Steven P. Finkbeiner, both of Bay city; Daryl O. Codling, Cass City, all of Mich.

[73] Assignee: Orbital Walbro Corporation, Cass City, Mich.

[21] Appl. No.: 977,128

[22] Filed: Nov. 16, 1992

[51] Int. Cl.⁵ .............................................. F01B 19/00
[52] U.S. Cl. ...................................... 92/93; 92/98 R; 92/100; 92/103 F
[58] Field of Search ...................... 92/93, 94, 96, 98 R, 92/102, 103 F, 100

[56] References Cited

U.S. PATENT DOCUMENTS

| | | | |
|---|---|---|---|
| 2,684,829 | 7/1954 | McFarland, Jr. | 92/103 F |
| 4,179,096 | 12/1979 | Fromfield | 251/30.05 |
| 4,619,436 | 10/1986 | Bonzer et al. | 92/98 D |
| 4,705,458 | 11/1987 | St. Laurent et al. | 417/393 |

FOREIGN PATENT DOCUMENTS 551265 11/1956 Italy ................................. 92/103 F

*Primary Examiner*—Thomas E. Denion
*Attorney, Agent, or Firm*—Barnes, Kisselle, Raisch, Choate, Whittemore & Hulbert

[57] ABSTRACT

A method of making and the product of the method in a diaphragm for use in a pressure regulator, or other similar uses, where leakage around the confined edges of the diaphragm must be avoided. The structure confining the edges of the diaphragm consists of a main housing body having a groove for receiving a rib or the outer periphery of the diaphragm and a secondary housing to clamp the periphery. The central portion of the diaphragm carries a top plate with a bottom groove to receive a rib on the central periphery of the diaphragm and a bottom disc to clamp the inner periphery. Diaphragms are made with a fabric sandwiched between flexible layers of material. This results in a flash edge which may cause wicking and prevents a proper seal in the grooves receiving the ribs. An angled trim on the peripheries allows a proper filling of the grooves and a leak proof seal.

2 Claims, 2 Drawing Sheets

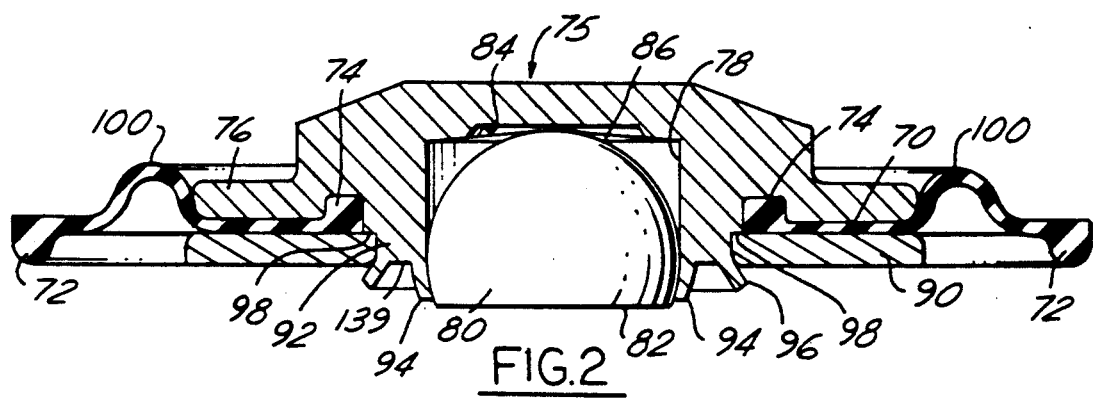
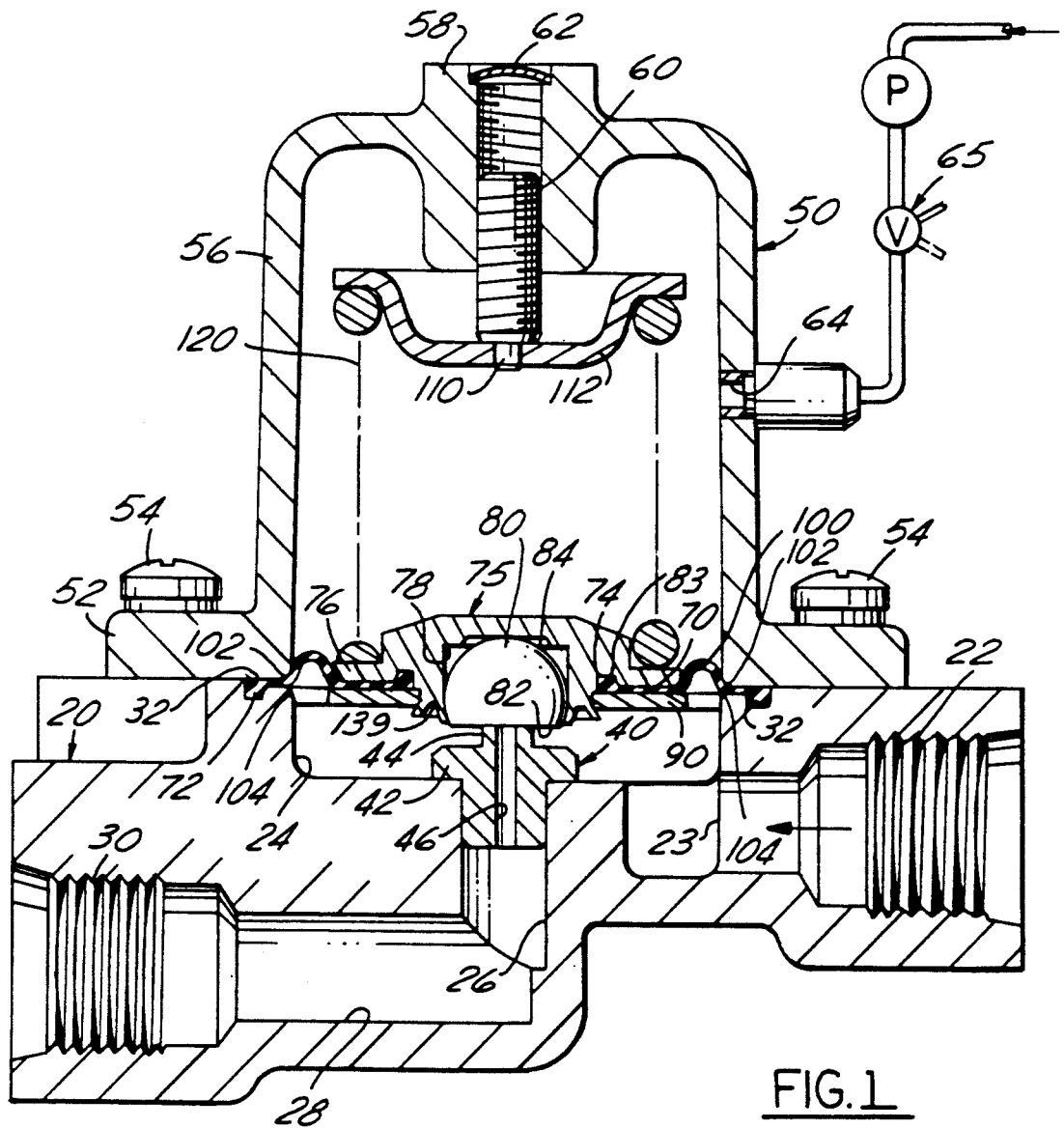

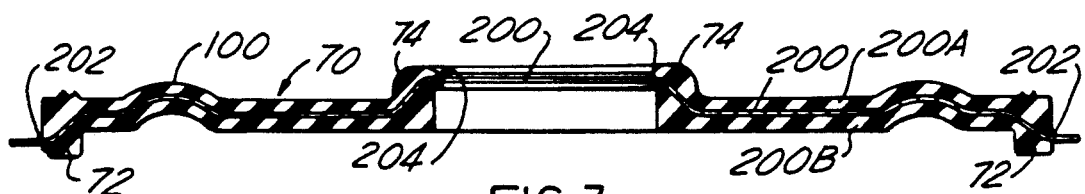
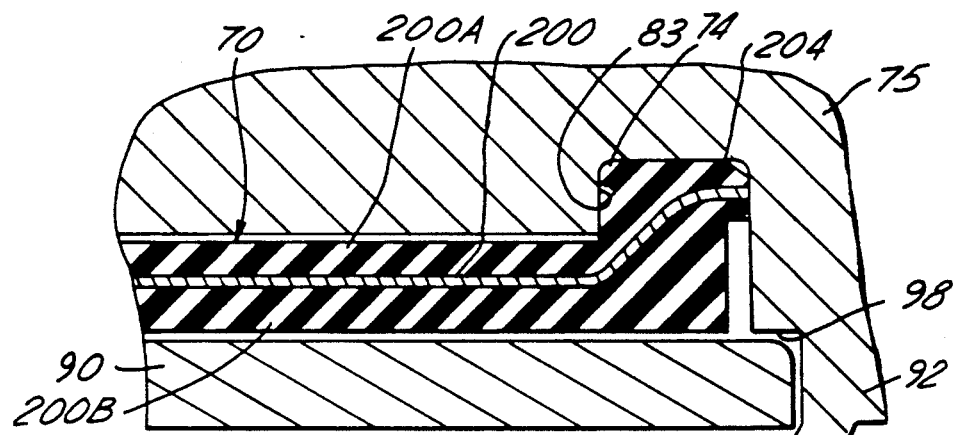
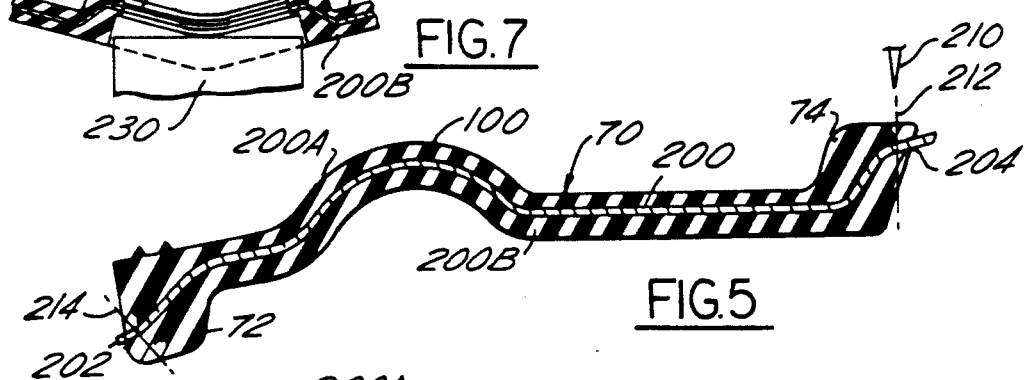
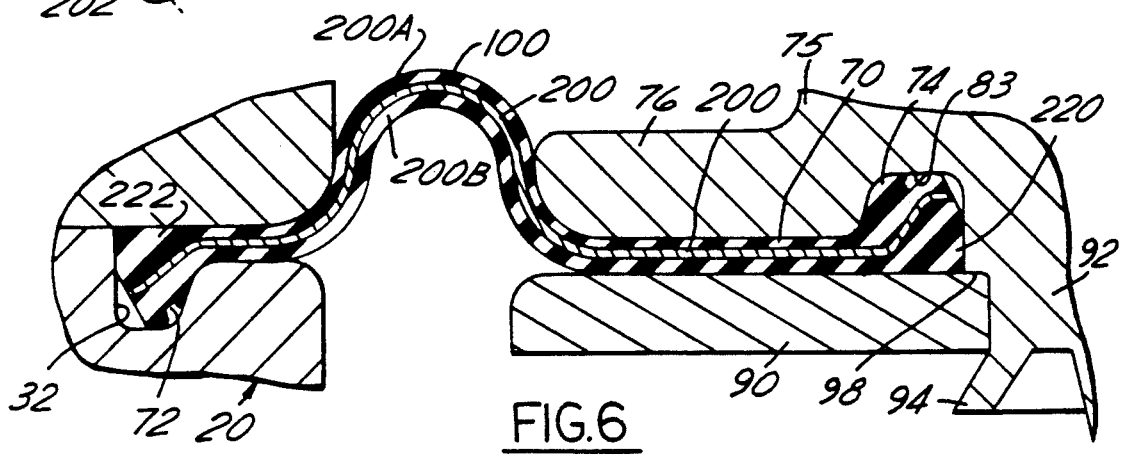

DIAPHRAGM FOR PRESSURE REGULATORS AND METHOD OF MAKING

RELATED APPLICATION

A related application to this case filed by the assignee of the present case is Ser. No. 07/938,383, filed Aug. 31, 1992.

FIELD OF INVENTION

Fluid pressure regulators using spring-backed, flatted, ball valves controlled by resiliently biased diaphragms peripherally mounted in a regulator housing.

BACKGROUND AND FEATURES OF THE INVENTION

There are hundreds of pressure regulator designs dating back to the beginning of the mechanical age of steam engines and compressed air actuators. The present invention contemplates an improved regulator design which is more compact and has a lower height dimension. The ball valve element having a flat valve surface is self-aligning. An improved diaphragm is confined peripherally and properly shaped at the peripheries to fill annular grooves for annular ribs on the diaphragm to insure a leak-proof seal. In addition, the diaphragm and valve assembly are conveniently designed for a single tool assembly.

The diaphragm is designed for use with liquid fuel or air and is also compatible with the use of alcohol or oxygenated fuels.

Other objects and features of the invention will be apparent in the following description and claims in which the principles of the invention are set forth together with details to enable persons skilled in the art to practice the invention, all in connection with the best mode presently contemplated for the invention.

BRIEF DESCRIPTION OF THE INVENTION

A flow body with inlet and outlet passages has a valve cavity with a ported valve insert centrally disposed and provided with a flat valve surface. A second body is disposed on the flow body and confines a ribbed outer periphery of a diaphragm. The second body has a spring housing with a coil spring which bears against an assembly centrally of the diaphragm which confines the central portion of the diaphragm and carries a ball valve with a flatted surface to cooperate with a flat valve surface. A flat finger spring bears against the confined surface of the ball valve to stabilize the valve in the central assembly. A compression limiting plate covers the undersurface of the central area of the diaphragm which has an integral inner annular rib to interfit with an annular groove in the central assembly. The peripheral edges of the diaphragm are trimmed to remove flash. The inner peripheral edge is trimmed in a manner to insure isolation of the fabric edges to avoid destructive wicking.

BRIEF DESCRIPTION OF THE DRAWINGS

DRAWINGS accompany the disclosure and the various views thereof may be briefly described as:

FIG. 1, a sectional view of an assembly of the pressure regulator valve.

FIG. 2, a view of a central assembly of the valve carrier and diaphragm.

FIG. 3, a sectioned view of a diaphragm to be used in the regulator.

FIG. 4, an enlarged partial section showing the inner periphery of a diaphragm.

FIG. 5, a view of diaphragm peripheries prior to a trim.

FIG. 6, a sectioned view of the inner and outer peripheries edges in the confining grooves.

FIG. 7, a view of a diaphragm molded in a dish shape to permit a straight-through die cut for the inner periphery.

DETAILED DESCRIPTION OF THE INVENTION AND THE MANNER AND PROCESS OF USING IT

This invention is directed to the avoidance of wicking in composite diaphragm formed of a fabric and an elastomer. Fabric exposure at the inner bead can result in fluid being forced through the diaphragm due to either wicking or a pressure differential to the surrounding environment. If fuel is trapped in the base fabric between the elastomer layers, delamination and eventual diaphragm failure will likely occur. Fuel could also pass to the ambient environment by means of wicking from the exposed fabric at the outer bead. This is a potential fire safety concern.

Prior art exists that addresses the problem of wicking in dual pressure regulation systems. This art has been applied to relatively low volume, high cost applications, such as is found in the aircraft industry. It involves an expensive molding process that completely encapsulates the base fabric with elastomer. There is no flash to be trimmed.

The diaphragm molding process that is involved in the present invention includes a trimming operation using a conventional calendered stock in which the elastomer is adhered to the base fabric prior to molding. Round discs of this stock are cut from a sheet and inserted into the mold where the elastomer is reflowed, the diaphragm shape is formed, and final curing of the rubber takes place.

During the molding process, the elastomer is forced from one area of the disc to another. Upon completion of molding, the elastomer that was originally occupying the center of the disc has been moved to form the sealing beads, thus leaving only base fabric remaining in the center. This fabric is removed during the trimming operation.

A concentric trim with respect to the diaphragm inner bead is very difficult to achieve. As a result, the diaphragm bead does fit properly into the plate groove and an elastomer seal is not achieved. This allows exposure of the base fabric to the regulated air or fuel. The angled trimming operation to be described insures that this fabric always remains back beyond the elastomer, thus insuring an elastomer seal formed against the groove wall.

In one embodiment, the diaphragm is molded and held in a trimming fixture at an angle that permits a straight cylindrical trim punch to perform the chamfered trim on the inner periphery. The outer bead may be trimmed square by conventional means, as it is not important whether the fabric is exposed at this location.

WITH REFERENCE TO THE DRAWINGS, in FIG. 1, there is illustrated a sectioned view of a pressure regulator assembly. A base body 20 has a side inlet port 22 open to a passage 23 leading to a central shallow chamber 24 surrounding a central bore 26. The central bore 26 opens to an outlet passage 28 connected to a port 30. On the flat top surface of body 20, as viewed in FIG. 1, is an annular groove 32 spaced outwardly of the side wall of the chamber 24.

In the central passage 26 is mounted a valve insert 40 having a flange 42 which seats on the base of the chamber 24. A central boss 44 has a flat top which serves as a valve surface. A central passage 46 opens to passage 28 and to the chamber 24.

A second body cap element 50 has an outer flange 52 which is clamped to the upper surface of the base body 20 by headed screws 54. A hollow dome portion 56 rises from the flange 52 and is closed by an end shape 58 in which a threaded element 60 is disposed to serve as an adjustment for a coil spring to be described. A closure disc 62 limits access to the element 60. A small atmospheric port 64 is provided in the wall of the dome 56. This port 64 is connected to a pressure source P for air supply through a valve 65. The valve 65 can connect the port to atmospheric ambient pressure or to the air supply from the pump P. When used as a fuel pressure regulator, the port 64 is connected to the pump P which is a source for high pressure air supply in the system. The regulator compensates for air pressure changes and maintains a constant differential pressure across the fuel injector seat (not shown).

Next to be described is the diaphragm assembly shown in FIGS. 1 and 2. A diaphragm 70 has an outer periphery on which is formed an annular sealing bead 72. The diaphragm has a central opening around the periphery of which is a second sealing bead 74. Centrally of the diaphragm is a shaped circular element 75 which has an outer flange 76 to serve as a spring retainer and a raised central portion in which is formed a valve recess 78 in which is a ball valve element 80 having a flat chordal surface 82. A shallow recess 84 accommodates the fingers of a flat finger spring 86 shown best in FIG. 3. This spring is easy to install and is self-aligning.

A compression limiting clamp plate 90 in the form of a ring is positioned below the diaphragm around a depending boss 92 outside the valve recess 78. In assembly the annular edge of the boss 92 is split into two opposed flanges. A first flange 94 is formed around the lower portion of the ball above the flat 82 to retain the ball in recess 78. A second flange 96 is formed outwardly to overlie the inner edge of the plate 90 to press the plate against the inner periphery of the diaphragm bead or rib. However, a ledge 98 limits the axial movement of the plate 90 and thus limits the compression of the inner periphery of the diaphragm bead or ring to control the diaphragm squeeze. This feature eliminates inconsistencies which could result in inadequate compression to cause leakage or overstressing and failure of the diaphragm material.

The diaphragm has a single convolute 100 confined on the inside by the outer edge of the ring 90 and on the outside by the control surfaces 102 and 104 of the mating parts 20 and 52.

Confined on the tip 110 of element 60 is a spring retainer plate 112 which confines a coil spring 120 extending to the flange 76 of part 75. The compression on this spring can be controlled by threaded element 60 to set the desired regulated pressure.

The molded diaphragm with the confined convolute provides improved regulation performance due to a more consistent effective area in relation to the valve stroke. This is most important with respect to obtaining acceptable slope characteristics in the regulation of air. The need for low cost fuel and air regulators takes on importance as new technology, such as pneumatic assist fuel injectors, become more commonly used. The convolute confinement in the molded diaphragm 70 also serves to reduce stretching of the diaphragm which can lead to tearing and rupturing and also lead to hysteresis in the performance curve.

The flatted ball 80 offers significant economic and performance advantages. It can be ground using commercially available ball bearings. The flat provides increased contact surface area between the ball flat and the valve body which avoids line contact wear. Also, the center of gravity is coincidental to the rotational axis which minimizes the tendency for parallel alignment of the ball flat to the valve seat to change due to gravity or vibration. This permits the design to be mounted horizontally with no impact on performance.

The housing 20 has an annular groove 32 (FIG. 6) to receive a rib 72 of the outer periphery of the diaphragm. Also, the plate 75 (FIG. 4) has an annular groove 83 to receive rib 74 of the inner periphery of the diaphragm.

In FIG. 3, a diaphragm 70 is shown as it appears after being molded. The diaphragm is molded under heat and pressure with a fabric center layer 200 between upper and lower layers 200A and 200B of suitable impervious elastomer such as fluorosilicone.

When the diaphragm is taken from the mold, the inner and outer peripheries have an extending flash as indicated at 202 and 204 in FIG. 3. When taken from the mold, the entire center is fabric and the hole has not been cut. The flash at the outer circumference is also quite large. The diaphragm is made of calendered stock. The elastomer is forced from the center during the molding process. In this flash, the fabric 200 is exposed and, if placed in the assembly as shown in FIG. 4, will act as a wicking which will ultimately destroy the diaphragm. Trimming of the flash after removal of the diaphragm from the mold is difficult because of the lack of concentricity of the trim. Close trimming in one area of the periphery may result in other areas where the flash is not closely trimmed. The present invention is directed cutting off the flash at an angle as shown in FIG. 5 where a blade 210 follows the path 212 at the inner periphery. With this chamfer cut, when the inner periphery is installed in the element of the pressure regulator as shown in FIG. 6, the exposed inner edge of the fabric 200 is spaced from the groove walls, thus insuring that membrane material at 220 is in contact with the walls of the groove 83 below and above the termination of the fabric 200. If this flash is left in place, this seal may not form due to noncentering of the diaphragm in the groove caused by non-concentric trimming operations. Thus, the trimmed diaphragm forms an elastomer seal and wicking cannot occur. This is especially important in dual high pressure applications where either air or fuel can wick, causing eventual failure of the diaphragm by means of delamination. With regard to the outer periphery, a trim 214 at an angle is not needed since it is not important whether the fabric is exposed at this outer surface. It is only exposed to ambient pressure.

In FIG. 7, a modified construction is illustrated wherein the diaphragm is formed in a dished shape originally. This presents the inner periphery of the central edge 74 in a position where a straight trim punch 230 can cut the periphery to trim the edge as shown at 220 in FIG. 6. This cut removes the center area of the fabric as well as trim the inner periphery at an angle to the axis of the element as required. Thus, when the inner rib 74 is disposed in the groove 83, FIG. 3, a seal will occur with the elastomer above and below the exposed edge of the fabric 200. Thus, no wicking can occur.

What is claimed is:

1. In a diaphragm assembly that comprises a flexible diaphragm having a central opening bounded by a circumferentially continuous annular rib, first means disposed on one side of said diaphragm having a channel in which said rib is disposed and second means opposed to said first means clamping said diaphragm therebetween, said first and second means forming fluid valve means spanning said central opening of said diaphragm, said diaphragm having a fabric core surrounded by flexible fluid-impervious material with said fabric core having a circular edge that is exposed through said material at said opening, the improvement to reduce wicking of fluid into said fabric core exposed at said circular edge around said opening in which said central opening is defined in part by a conical wall surface terminating at an axial surface of said diaphragm rib within said channel, said fabric core being exposed within said conical wall surface at a diameter greater than minimum diameter of said opening, said diaphragm at said minimum diameter of said opening being in sealing engagement with an opposed surface of said channel in said first means, said conical wall surface functioning in assembly with said first and second means to space said fabric edge from channel surface and thereby preventing wicking by direct contact of said fabric core with fluid on said channel surface.

2. The assembly set forth in claim 1 wherein said diaphragm has an outer periphery defined in part by a conical surface at said outer periphery, said fabric core being exposed at said outer periphery within said conical surface at a diameter less than maximum diameter at said outer periphery.

* * * * *